W. E. DAY.
CONNECTING ROD BEARING.
APPLICATION FILED JUNE 25, 1918.
1,341,548.
Patented May 25, 1920.
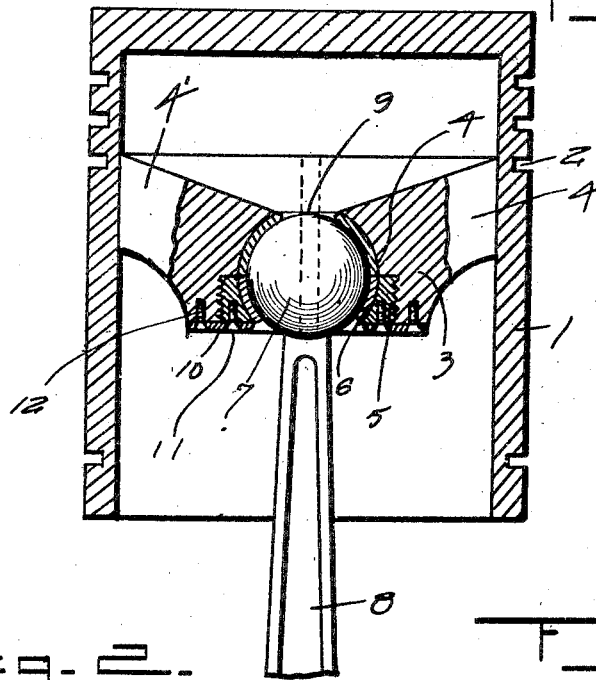
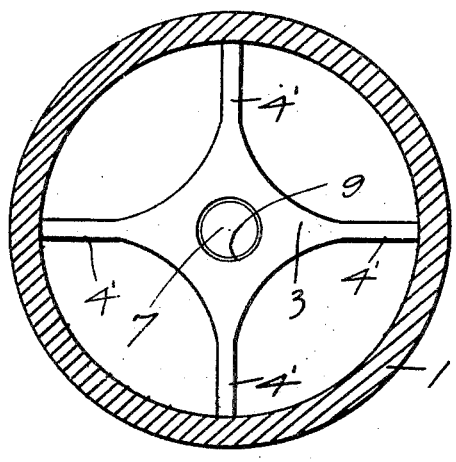 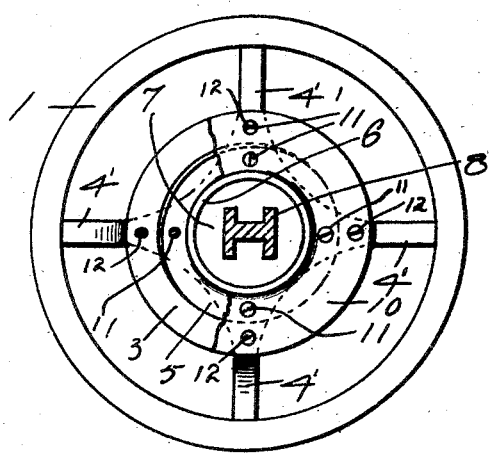
Inventor
W. E. Day.

UNITED STATES PATENT OFFICE.

WILLIAM E. DAY, OF PITTSBURGH, PENNSYLVANIA.

CONNECTING-ROD BEARING.

1,341,548.  Specification of Letters Patent.  Patented May 25, 1920.

Application filed June 25, 1918. Serial No. 241,782.

*To all whom it may concern:*

Be it known that I, WILLIAM E. DAY, a citizen of the United States, residing at Pittsburgh, in the county of Allegheny and State of Pennsylvania, have invented certain new and useful Improvements in Connecting-Rod Bearings; and I do hereby declare the following to be a full, clear, and exact description of the invention, such as will enable others skilled in the art to which it appertains to make and use the same.

This invention relates to improvements in connecting rod joints, and has for one of its objects the provision of means whereby universal movement can be had between the connecting rod and the piston to permit the piston to adjust itself automatically to the force of explosion, and also permit an even wear of the piston in the cylinder of the engine, thereby obviating the oval shaped wearing caused by the ordinary form of wrist pins.

Another object of this invention is the provision of means whereby the wear in the connection between the connecting rod and the piston can be readily taken up.

A further object of this invention is the provision of means whereby the connection will be thoroughly lubricated, thus reducing the wearing of the parts.

A still further object of this invention is the provision of a connecting rod bearing of the above stated character, which will be simple, durable and efficient, and which may be manufactured and sold at a comparatively low cost.

With these and other objects in view, as will become more apparent as the description proceeds, the invention consists in certain novel features of construction, combination and arrangement of parts as will be hereinafter more fully described and claimed.

For a complete understanding of my invention, reference will be had to the following description and accompanying drawing, in which:

Figure 1 is a vertical sectional view of a connecting rod bearing constructed in accordance with my invention, Fig. 2 is a transverse sectional view of the same, and Fig. 3 is an end elevation, partly in section, illustrating a locking blade.

Referring in detail to the drawing, the numeral 1 indicates an ordinary piston, having the piston ring grooves 2. A web 3 has formed thereon arms or wings 4', which are casted integral with the interior wall of the piston in spaced relation to the top wall thereof, or at a point where the usual wrist pin openings are provided. The web 3 is provided with a bearing opening 4 of semicircular formation, having its lower portion enlarged and internally screw threaded to receive a bearing section 5, the face of which is concaved to conform to the contour of the bearing opening 4. A bushing 6 is positioned within the bearing opening 4 and against the face 6 of the section 5 for engagement with the ball or sphere 7, formed upon an ordinary connecting rod 8. The bearing opening 4, as well as the bushing 6, is provided with an opening 9 to permit lubricant to enter the upper end of the bearing opening onto the ball or sphere 7, thus permitting the same to work freely within the bushing. The upper face of the web 3 is inclined in the direction of its center to direct the lubricant in the opening 9.

A locking ring or plate 10 is provided with an opening to permit the connecting rod 8 to extend therethrough and a portion of the ball or sphere 7, so that the ball or sphere can move freely within its socket. The locking plate 10 is secured to the bearing section 5 by means of set screws 11, and is also secured to the web 3 by set screws 12, whereby the bearing section 5 is locked in the web 3 against accidental movement. Having the bearing section 5 threaded into the head 3 provides means wherein adjustment can be made to the socket for the ball or sphere 7 to take up the wear upon the same and the wall of the bushing.

While I have shown and described the preferred embodiment of my invention, it will be understood that minor changes in construction, combination and arrangement of parts may be made without departing from the spirit and scope of the invention as claimed.

Having thus described my invention, what I claim is:

A connecting rod bearing including a hollow piston, a web located in the piston and having a recess in its lower face, arms formed on the web and piston and adapted to permit free passage of lubricant by the web, a connecting rod having a ball formed on one of its ends and disposed in the recess, means holding the ball in the recess, said web having an opening communicating with the recess and extending through the top wall of said web, and said web having its top face inclined in the direction of the opening to direct lubricant into said opening.

In testimony whereof I affix my signature in presence of two witnesses.

WILLIAM E. DAY.

Witnesses:
FRANK L. STEWART,
ERNEST R. ABBOTT.